May 12, 1953 W. M. HARKS 2,638,229
COMBINED FILTER AND HOSE REEL
Filed May 26, 1948
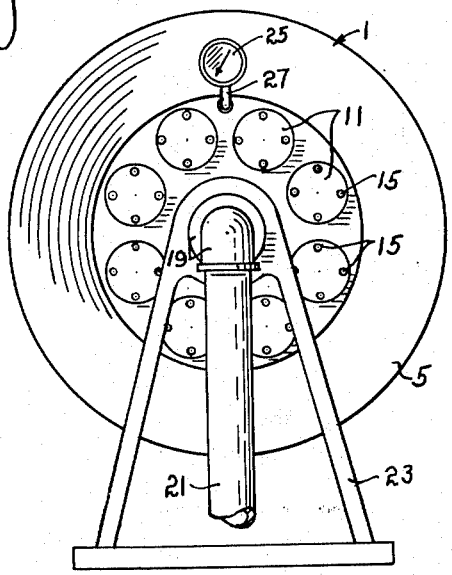
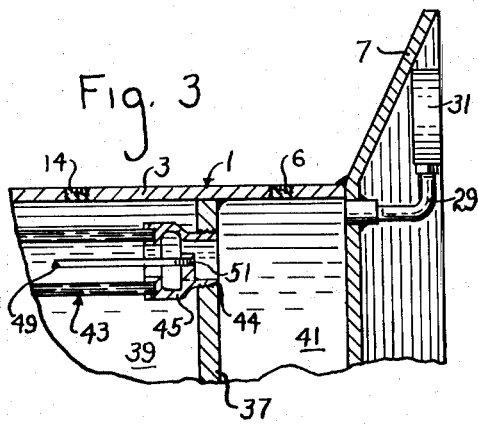
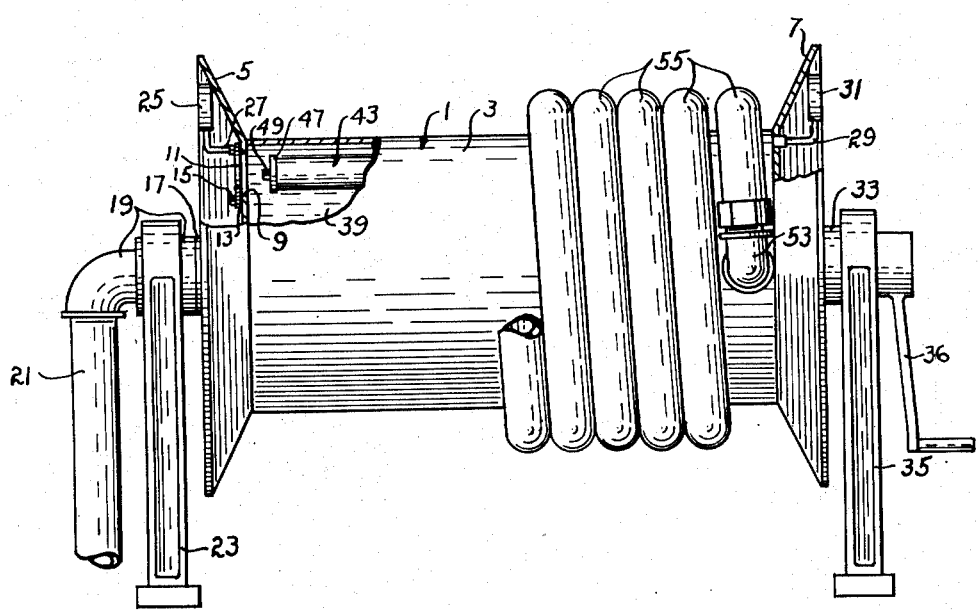
WALTER M. HARKS
INVENTOR.
BY Edmund W. E. Kamm
ATTORNEY Patented May 12, 1953

2,638,229

UNITED STATES PATENT OFFICE 2,638,229

COMBINED FILTER AND HOSE REEL

Walter M. Harks, Algona, Iowa, assignor to Bowser, Inc., Fort Wayne, Ind., a corporation of Indiana Application May 26, 1948, Serial No. 29,262

4 Claims. (Cl. 210—184)

This invention relates to a combined filter and hose reel. More especially, it relates to a hose reel which has a plurality of filter elements mounted within its drum.

In many liquid dispensing installations, delivery is made through a relatively long hose which is stored on a hose reel when it is not in use. It is also often necessary to filter the liquid as it is dispensed. Both the reel and filter are bulky objects and in many installations the room available for such equipment is severely limited. This is particularly true on tank trucks and in fueling pits.

In order to conserve material and space, I propose to combine the two devices. The hose reel usually comprises a relatively large diameter drum provided with end flanges. The drum is necessarily large because a relatively stiff hose is used and this cannot be bent to a small drum. The space inside the drum is wasted in present practice. I propose to utilize this space as a filtering chamber as described below.

It is therefore an object of this invention to provide a combination hose reel and filter.

Another object of this invention is to provide a hose reel having a closed, cylindrical drum which is utilized as a filter case to house filter elements.

A further object of this invention is to provide a hose reel having a closed, cylindrical drum which is utilized as a filter case to house filter units and to provide removable plates on one end of the drum to permit inspection and replacement of the filter elements.

Yet another object of this invention is to provide a hose reel having a closed, cylindrical drum divided into two compartments by a head and filter elements connected to said head to filter the liquid flowing between said compartments.

It is still another object of this invention to provide an integrated hose reel and filter unit and to provide gages to indicate the inlet and the outlet pressures.

These and other objects will become apparent from a study of this specification and the drawings which are attached hereto and made a part hereof, and in which:

Figure 1 is an elevation, partially in section, showing the combined hose reel and filter unit with parts broken away to show the filter and gages.

Figure 2 is an end view of the device taken from the left of Figure 1 showing the reel inlet, the inspection plates and the inlet pressure gage.

Figure 3 is an enlarged section of the shell showing one filter element screwed into the deck plate, the outlet compartment and the outlet gage.

Referring to the drawings, the numeral 1 designates the combined reel and filter case in general, which is comprised of a hollow cylindrical drum 3 and circular heads 5 and 7 of greater diameter than the drum and dished outward from the periphery of the drum. The heads are preferably secured to the ends of the drum by a continuous weld. The drum has openings 14 and 6 therein which are fitted with removable plugs and which serve as vent or drain openings as described below.

The head 5 is on the inlet end of the drum and has a plurality of equally spaced holes 9 disposed within the periphery of the drum. Cover plates 11 and gaskets 13 are fastened to the head by bolts 15 to seal the holes. A conduit 17 is concentrically secured to the head in communication with the interior of the cylinder 3. This conduit, together with the rotary, sealed joint 19 and the pipe 21, serves as the inlet line to the cylinder. The joint is supported by a bracket 23. A pressure gage 25 is connected to cylinder 3 by tube 27 which passes through the head and is mounted adjacent the flange of 5.

The other head 7 is similar to the head 5 but does not have the inspection holes. A tube 29 is fixed to and extends through the head and supports a pressure gage 31. A solid journal 33 is fastened concentrically to the head and extends through a bearing on the support bracket 35. It carries a crank 36 for rewinding the hose. It is understood, of course, that a chain or other rewinding mechanism, either power or manually operated, may be used.

The drum 3 has a wall 37 welded in a position normal to its axis to divide the interior of the drum into an inlet compartment 39 adjacent the head 5 and an outlet compartment 41 adjacent the head 7. A plurality of drilled and tapped holes 44 are spaced radially about the central axis of the deck plate in axial alignment with the holes 9.

Filtering elements 43, in the form of a hollow cylinder having a head 45 at one end provided with threads, are mounted in the holes 44. A cap 47 seals the opposite end of each element. A tie rod 49 passes through the cap 47, through the element and enters a tapped hole 51 in the head 45 to hold the heads in sealing relationship with the element. Of course, it is understood that any suitable filtering element may be utilized instead of the specific form just disclosed.

An outlet elbow 53 is welded or otherwise attached to the drum and communicates with the outlet compartment 41. It is threaded to receive the coupling of a hose 55.

Operation

The reel is rotated by means of the crank 36 to wind the hose on the drum in the conventional manner and the hose is pulled manually from the reel.

The liquid enters the compartment or chamber 39 under pressure by way of pipe 21, rotary joint 19 and conduit 17. From there it is filtered through the walls of the elements 43 into their interiors and passes through the channels of the head 45 and into the compartment or chamber 41. The liquid then passes from compartment 41 through elbow 53, through hose 55 and is discharged through a suitable nozzle.

Upon completion of the delivery the hose is rewound upon the drum in one or more courses, substantially as shown in Figure 1.

When the filter elements become plugged or dirty they may be withdrawn from chamber 39, after it has been drained through vents 14 and 6, by removing the screws 15 and cover plates 11 and unscrewing the elements from the partition. The filter elements may then be cleaned and reinserted or new elements may be substituted therefor and the cover plates be replaced. The chambers may then be refilled with vents 14 and 6 open. The plugs are then replaced in the vents and when the hose is filled the apparatus will again be ready for service.

The difference in pressure readings on the gages indicates when cleaning of the filters is necessary.

It is obvious that various changes may be made in the form, structure and arrangements of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. A combined filter and reel comprising a liquid-tight drum, means mounting said drum for rotation about an axis, means for rotating the drum, an inlet and an outlet conduit for the drum, a hose connected to the outlet conduit and wound on the drum, a partition in the drum disposed transversely of the axis of rotation thereof to separate the drum into inlet and outlet chambers, means defining openings in the partition, a plurality of filter elements supported in communication with the openings and disposed parallel to the axis of rotation, and means defining openings in one end of the drum in alignment with said filter elements for the reception and removal of the filter elements.

2. A combined filter and reel comprising a liquid-tight drum, means mounting said drum for rotation about an axis, means for rotating the drum, an inlet and an outlet conduit for the drum, a hose connected to the outlet conduit and wound on the drum, a partition in the drum disposed transversely of the axis of rotation thereof to separate the drum into inlet and outlet chambers, means defining openings in the partition, a plurality of cylindrical filter elements supported in communication with the openings and disposed parallel to the axis of rotation, and means defining openings in one end of the drum in alignment with said filter elements for the reception and removal of the filter elements.

3. A combined filter and reel comprising a liquid-tight drum, means mounting said drum for rotation about an axis, means for rotating the drum, an inlet and an outlet conduit for the drum, a hose connected to the outlet conduit and wound on the drum, a partition in the drum disposed transversely of the axis of rotation thereof, means defining a plurality of openings in said partition in spaced relation to each other adjacent the periphery of the partition, a plurality of cylindrical filtering elements mounted in communication with said openings, each with its axis substantially parallel to the drum axis, means defining hand openings in the head adjacent said elements and in substantial alignment therewith, and removable closure means for said hand openings.

4. A combined filter and reel comprising a liquid-tight drum, means mounting said drum for rotation about an axis, means for rotating the drum, an inlet and an outlet conduit for the drum, a hose connected to the outlet conduit and wound on the drum, a partition in the drum disposed transversely of the axis of rotation thereof to separate the drum into inlet and outlet chambers, means defining openings in the partition, a plurality of cylindrical filter elements supported in the inlet compartment in communication with the openings and disposed parallel to the axis of rotation and positioned radially so that each is out of alignment with said mounting means in at least one rotative position of the drum, and means defining openings in one end of the drum, one in alignment with each of said filter elements for the reception and removal of the filter elements.

WALTER M. HARKS.

References Cited in the file of this patent

UNITED STATES PATENTS

| Number | Name | Date |
|---|---|---|
| 552,123 | Guild | Dec. 31, 1895 |
| 654,592 | Barr | July 31, 1900 |
| 773,971 | Nuhring et al. | Nov. 1, 1904 |
| 1,146,757 | Frenier | July 13, 1915 |
| 1,823,171 | Hele-Shaw | Sept. 15, 1931 |
| 2,348,925 | Reichhelm | May 16, 1944 |
| 2,365,766 | Levier | Dec. 26, 1944 |